United States Patent [19]

Snider

[11] Patent Number: 5,109,031

[45] Date of Patent: Apr. 28, 1992

[54] RIGID FOAM WITH IMPROVED "K" FACTOR BY REACTING A POLYISOCYANATE AND POLYESTER POLYOL CONTAINING LOW FREE GLYCOL

[75] Inventor: Scott C. Snider, Seminole, Fla.

[73] Assignee: Jim Walter Research Corp., St. Petersburg, Fla.

[21] Appl. No.: 698,226

[22] Filed: May 10, 1991

Related U.S. Application Data

[63] Continuation of Ser. No. 612,386, Nov. 14, 1990, abandoned, which is a continuation of Ser. No. 322,399, Mar. 13, 1989, abandoned.

[51] Int. Cl.$^5$ ............................................. C08G 18/14
[52] U.S. Cl. ...................................... 521/99; 521/131; 521/172; 521/173; 428/308.4; 428/423.1
[58] Field of Search ................ 521/99, 131, 172, 173; 428/308.4, 423.1

[56] References Cited

U.S. PATENT DOCUMENTS

| | | | |
|---|---|---|---|
| 4,237,238 | 12/1980 | DeGuiseppi et al. | 521/131 |
| 4,346,229 | 8/1982 | Derr et al. | 560/91 |
| 4,411,949 | 10/1983 | Snider et al. | 428/304.4 |
| 4,417,001 | 11/1983 | Svoboda et al. | 521/114 |
| 4,439,550 | 3/1984 | Brennan | 521/131 |
| 4,469,824 | 9/1984 | Grigsby, Jr. et al. | 521/173 |
| 4,521,611 | 6/1985 | Magnus | 560/91 |
| 4,526,908 | 7/1985 | Magnus et al. | 521/172 |
| 4,540,771 | 9/1985 | Ambrose et al. | 528/272 |
| 4,714,217 | 12/1987 | Londrigan | 521/131 |
| 4,720,571 | 1/1988 | Trowell | 560/91 |
| 4,758,607 | 7/1988 | Hallmark et al. | 521/172 |

OTHER PUBLICATIONS

Polyester Polyols in Rigid Polyurethane and Polyisocyanurate Foams for Structural Building Panels, Polyurethanes World Congress, 1987, W. W. Reichmann et al.

Primary Examiner—Maurice J. Welsh
Attorney, Agent, or Firm—Charles W. Vanecek

[57] ABSTRACT

Rigid cellular polymers are made by reacting an organic polyisocyanate with a polyol component comprising a polyester polyol having a free glycol content of less than about 7 percent by weight of the polyester polyol in the presence of a blowing agent. The use of the polyester polyol enhances the thermal insulating properties of the foams.

28 Claims, No Drawings

RIGID FOAM WITH IMPROVED "K" FACTOR BY REACTING A POLYISOCYANATE AND POLYESTER POLYOL CONTAINING LOW FREE GLYCOL

This is a continuation of application Ser. No. 07/612,386, filed Nov. 14, 1990, now abandoned, which is a continuation of application Ser. No. 07/322,399, filed Mar. 13, 1989, now abandoned.

BACKGROUND OF THE INVENTION

1. Field of the Invention

This invention relates to the preparation of rigid cellular polymer materials, particularly polyisocyanurate and polyurethane foams, characterized by improved insulating properties. More particularly, the invention relates to an improvement in the foam's insulating capacity by reacting a polyisocyanate and polyester polyol containing low free glycol.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

Because of the relatively high cost of various typical polyols useful in making cellular polymers and because an inexpensive source of polyols is now available from such sources as crude dimethyl terephthalate oxidate residues, recycled poly (ethylene terephthalates), and various other scrap polyester sources, efforts have heretofore been directed to processes for converting these materials to commercially useful polyester polyols. These efforts have led to a number of polyester polyols found to be highly suitable in producing foams of good quality. However, there is still a search for improvements in these polyols and the ways of using them in foam manufacture.

A most important characteristic of rigid foams is their insulating value which is expressed by the k- and aged k- factor. The k-factor is a measurement of the insulating properties (thermoconductivity) and the aged k-factor indicates insulating properties over time. It would be most beneficial to provide improved polyester polyols for the production of rigid foams having a combination of advantageous properties, including especially good insulating properties, as reflected in low initial thermal conductivity values and low thermal conductivity values after prolonged periods of use.

OBJECTS OF THE INVENTION

It is accordingly an object of the present invention to provide improved rigid plastic foams, especially polyisocyanurate and polyurethane foams, having a combination of advantageous properties, including excellent thermal insulative properties, good dimensional stability, thermal resistance, and compressive strength and reduced friability, and an improved method of producing the foams.

It is another object of the present invention to provide closed cell foam materials which can be used in building panels which are highly insulating, thermally resistant, low in friability, and soundproof.

It is a further object of the present invention to provide a polyester polyol composition for use as a reactant in the preparation of rigid plastic foams having a combination of advantageous properties, especially an improved insulating efficiency.

DESCRIPTION OF THE INVENTION

The above objects have been achieved by the use of a polyester polyol composition containing a low free glycol content for the formation of rigid plastic foams having improved insulating properties. The polyester polyol compositions of the invention may be prepared by reacting a polycarboxylic acid and/or acid derivative with a polyol component comprising at least one glycol compound. The improved foams of the invention advantageously comprise polyisocyanurate and polyurethane foams prepared by reacting together a polyisocyanate and the polyester polyol composition, and optionally other polyhydroxyl compounds in the presence of a blowing agent(s). The reaction may be carried out in the presence of catalysts, auxiliaries and additives.

The polyester polyols of the invention are those which contain free glycol. The term "polyester polyol" as used in this specification and claims includes any unreacted glycol remaining after the preparation of the polyester polyol and/or glycol added after the preparation. It has been discovered that polyester polyols having a low free glycol content—e.g., 0 through 5% by weight of the total polyester polyol composition—are highly effective in improving the insulating qualities of rigid foams, particularly urethane-modified isocyanurate foams. While polyester polyols containing free glycol are widely used in foam production, it has heretofore been unrecognized that lowering the glycol content would beneficially influence a foam's insulation value. Typically, polyester polyols currently employed in producing polyurethane and polyisocyanurate foams have glycol levels which are at least about 7–12 percent by weight of the total polyester polyol and can range up to about 36–40 weight percent of the total. Following are the typical free glycol levels of representative commercial polyester polyols:

| POLYESTER POLYOL | SUPPLIER | FREE GLYCOL (WT. %) |
|---|---|---|
| Stepanpol PS-3152 | Stepan Company | 16 |
| LoFyr 57 | DRC Chemical | 11 |
| Adlol 450 | Adlol | 21.6 |
| Foamol 250 | Sloss Industries | 25 |
| Foamol 350 | Sloss Industries | 12 |
| Foamol 351 | Sloss Industries | 17 |
| Foamol 353 | Sloss Industries | 15 |
| Foamol 3500 | Sloss Industries | 20 |
| Terate 203 | Hercules | 10 |
| Terate 202 | Hercules | 24 |
| Chardol 329 | Chardonol | 10.5 |
| Chardol 170 | Chardonol | 16.5 |
| Chardol 570 | Chardonol | 23.4 |
| Terol 250 | Oxid | 12 |

In accordance with the present invention, the free glycol content of the polyester polyol is sufficiently low to bring about significant improvement in foam insulation value. Typically, the free glycol content is less than about 7, preferably less than about 6, and more preferably less than about 5, percent by weight of the total polyester polyol composition.

The polyester polyols useful in the invention can be prepared by known procedures from a polycarboxylic acid or acid derivative, such as an anhydride or ester of the polycarboxylic acid, and a glycol(s) or a glycol-containing mixture of polyols. Particularly suitable polyester polyols of the invention are aromatic polyester polyols containing phthalic acid residues. The polycarboxylic acid may include aliphatic, cycloaliphatic, aromatic and/or heterocyclic components and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephathalic acid-bis-glycol ester.

The glycols of the invention may contain heteroatoms (e.g., thiodiglycol) or may be composed solely of carbon, hydrogen, and oxygen. They are advantageously simple glycols of the general formula $C_nH_{2n}(OH)_2$, or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
(a) alkylene radicals each containing from 2 through 6 carbon atoms, and
(b) radicals of the formula:

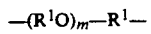

wherein $R^1$ is an alkylene radical containing from 2 through 6 carbon atoms, and m is an integer of from 1 through 4, and
(c) mixtures thereof.

Besides the glycols, any suitable polyhydric alcohol may be used in preparing the polyester polyols. These additional polyols can be aliphatic, cycloaliphatic, aromatic and/or heterocyclic, and are preferably selected from the group consisting of diols, triols and tetrols. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. These additional polyols are used in amounts which do not detract from the enhanced insulating properties stemming from the low free glycol content of the polyester polyols.

The polyester polyols of the invention advantageously contain at least 1.8 hydroxyl groups and generally have an average equivalent weight of from about 75 to 500. Preferably, the polyesters contain from about 1.8 to 8 hydroxyl groups and have an average equivalent weight of from about 100 to 500, more preferably from about 175 to 375. Highly desirable aromatic polyester polyols of the invention have an average functionality of about 1.8 to 5, preferably about 2 to 2.5. Polyesters whose acid component advantageously comprises at least about 30% by weight of phthalic acid residues are particularly useful. By phthalic acid residue is meant the group

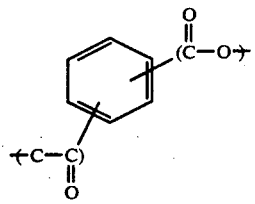

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the glycols or glycol mixtures of the invention to polyester polyols through conventional transesterification or esterification procedures.

While the polyester polyols can be prepared from substantially pure reactant materials, more complex ingredients are advantageously used, such as the sidestream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, triethylene glycol and higher homologs or mixtures thereof. The similar homologous series of propylene glycols can also be used. Glycols can also be generated in situ during preparation of the polyester polyols of the invention by depolymerization of polyalkylene terephthalates. For example, polyethylene terephthalate yields ethylene glycol. Polyester polyols derived from raw materials containing compounds having the above defined phthalic acid residues constitute a preferred embodiment of the invention.

In the production of the free glycol-containing polyester polyols of the invention, a polycarboxylic acid or acid derivative can be simply reacted with a glycol or glycol mixture until the hydroxyl and acid values of the reaction mixture fall in the desired range.

The reaction typically is performed at temperatures from about 150° C. to 250° C. for a period from about 1 to 10 hours. The reaction can be carried out as a batch process or continuously. Excess glycol can be distilled from the reaction mixture during and/or after the reaction. Normally, an effective amount of catalyst is added to promote the present reaction. Any conventional esterification or transesterification catalyst (single compound or mixture of compounds) can be used. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable metal catalysts include sodium and potassium acetate, tetraisopropyl titanate, and other such titanate salts, and the like.

A preferred polyester polyol of the invention is prepared by reacting a polycarboxylic acid and/or acid derivative, e.g., phthalic anhydride, with a suitable glycol starting material. Especially useful alkylene glycols have the formula

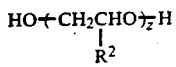

wherein R² is hydrogen or lower alkyl of one to four carbon atoms, preferably hydrogen or methyl, and z is from 1 to 5, preferably 1 to 3, and more preferably 1 to 2. Examples of the alkylene glycols are ethylene glycol, propylene glycol, diethylene glycol, dipropylene glycol, triethylene glycol, tetraethylene glycol, tripropylene glycols and tetrapropylene glycol, among others, and mixtures thereof. Especially suitable glycols are ethylene glycol and diethylene glycol.

The phthalic anhydride starting material can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues for reaction with the free glycol-containing polyester polyols in accordance with the invention are polyalkylene terephthalate, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Hercules, Inc., Wilmington, Del., sells DMT process residues under the trademark Terate ®101. DMT process residues having a different composition but still containing the aromatic esters and acids are also sold by DuPont and others. The DMT process residues to be transesterification fied in accordance with the present invention preferably have a functionality at least slightly greater than 2.

Such suitable residues include those disclosed in U.S. Pat. Nos. 3,647,759, 4,411,949, and 4,714,717, the disclosures of which with respect to the residues are hereby incorporated by reference.

The properties of the polyester polyol of the present invention fall within rather broad ranges. The viscosities (Brookfield) of the polyol measured in cps. at 25° C. fall within a rather broad range from about 500 to about 500,000, preferably about 500 to about 100,000, and most preferably about 2,000 to about 50,000; the hydroxyl number values fall within a range of from about 115 to about 750, preferably about 150 to about 600, and most preferably from about 160 to about 320; the acid number falls within a range of from about .2 to about 40 and preferably about .2 to about 10. The hydroxyl number can be defined by the equation:

$$OH = \frac{56.1 \times 1000 \times f}{M.W.}$$

wherein
OH = hydroxyl number of the polyol;
f = average functionality, that is, average number of hydroxyl groups per molecule of polyol;
M.W. = average molecular weight of the polyol.

Highly preferred polyester polyols of the invention are derived from the reaction of phthalic anhydride or phthalic acid with ethylene and/or diethylene glycol, and are characterized by a viscosity in cps at 25° C. of about 8,000 to 35,000, a free glycol content of from about 0 through 5 percent by weight of the polyester polyol, and a hydroxyl number within a range of from about 190 to 240.

The polymer foams of the present invention can be prepared by using standard techniques known to those skilled in the art. The polyester polyols are particularly useful in the preparation of polyisocyanurate foams and polyurethane foams. In an advantageous embodiment of the invention, the polyester polyols are employed in admixture with at least one other polyol in the production of these foams, especially the polyurethane foams. The polyisocyanurate and polyurethane foams can be prepared by mixing together the organic polyisocyanate with the polyol, catalyst and blowing agent at temperatures ranging from about 0° C. to 150° C.

The polyisocyanurate or polyurethane foam of the invention particularly comprises the reaction product of an organic polyisocyanate, a blowing agent, a catalyst, auxiliaries and additives as required, and a polyol component which comprises (a) a polyester polyol having a low free glycol content or (b) a polyol mixture of the low free glycol-containing polyester polyol with at least one other polyol. The amount of the low free glycol-containing polyester polyol in polyol mixture (b) is advantageously sufficient to reduce the aged k-factor of the resultant foam to below the aged k-factor of the corresponding foam prepared from the same foam-forming composition and having the same index except that the polyol component solely consists of the other polyol or polyols and excludes the low free glycol-containing polyester polyol. Preferably, the polyol component employed in manufacturing the polyisocyanurate or polyurethane foam of the invention comprises (a) a polyester polyol having a free glycol content of less than about 7 percent by weight of the polyester polyol or (b) a mixture of the free glycol-containing polyester polyol with at least one other polyol, the total free glycol content of polyol mixture (b) being less than about 7 percent by weight of the content of polyester polyol in said mixture.

The polyurethane foams can be prepared by reacting the polyol of the invention and polyisocyanate on an essentially 1:1 to 1:1.25 equivalent basis. In the embodiment wherein the polyester polyols of the invention are combined with another polyol(s) to produce polyurethane foams, the polyester polyols of the invention can comprise about 5 to 100, preferably about 40 to 100, and more preferably about 50 to 100, weight percent of the total polyol content in the foam preparations.

The polyisocyanurate foams of the invention are prepared by reacting the polyisocyanate with a minor amount of polyol, such as sufficient polyol to provide about 0.10 to 0.70 hydroxyl equivalents of polyol per equivalent of said polyisocyanate, wherein the polyester polyol of the invention comprises about 5 to 100, and preferably about 50 to 100, weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

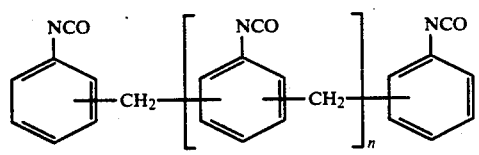

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the trade names of CODE 047 or PAPI-20 (Upjohn) and MR 200 (Mobay) can successfully be employed within the spirit and scope of the present invention.

In order to ensure complete reaction of isocyanurate foams, the polymethylene polyphenylisocyanate and the polyol are generally mixed in an equivalent ratio of 1.5:1 to 6:1 and preferably 2:1 to 5:1. In ranges outside these proportions the reaction tends to yield a product having less desirable physical characteristics.

The polyols which can be employed in combination with the polyester polyols of the invention in the preparation of the polyurethane and polyisocyanurate foam compositions include monomeric polyols and polyether polyols in general. The polyether polyols are found particularly useful in preparing rigid polyurethane foams. The polyfunctional active hydrogen initiators used in producing the polyether polyols preferably have a functionality of 2–8, and more preferably have a functionality of 3 or greater (e.g., 4–8).

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2$, $CClFCClF_2$, trifluorochloropropane, difluorodichloromethane, 1-fluoro-1,1-dichloroethane, 1,1-trifluoro-2, 2-dichloroethane, 1,1-difluoro-1-chloroethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

The foams also can be produced using a froth-foaming method, such as the one disclosed in U.S. Pat. No. 4,572,865. In this method, the frothing agent can be any material which is inert to the reactive ingredients and easily vaporized at atmospheric pressure. The frothing agent advantageously has an atmospheric boiling point of −50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, and the like. The catalysts generally comprise from about .1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris(dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about .4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g. potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

Other additives may also be included in the foam formulations. Included are processing aids, viscosity reducers, such as 1-methyl-2-pyrrolidinone, nonreactive and reactive flame retardants, such as tris(2-chloroethyl)-phosphate, dispersing agents, plasticizers, mold release agents, antioxidants, compatibility agents and fillers and pigments. The use of such additives is well known to those skilled in the art.

The present invention also provides a process for producing a laminate which comprises (a) contacting at least one facing sheet with a foam-forming mixture comprising an organic polyisocyanate, a blowing agent, a catalyst and the polyol composition, and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the synthesis of polyisocyanurate foams (18% trimer) utilizing polyester polyols having different free glycol contents.

In each foam synthesis, the following ingredients in the quantities (g) shown in Table I below were combined as indicated.

| ITEM | INGREDIENT |
|---|---|
| A | Polymethylene polyphenylisocyanate[1] |
| B | R-11B |
| C | Silicone surfactant[2] |
| D | Polyol (See Table I) |

-continued

| ITEM | INGREDIENT |
|------|------------|
| E | Catalyst[3] |

[1]Isocyanate having an equivalent weight of 138, an acidity of 0.03% HCl, and a viscosity of 2000 cps at 25° C.
[2]Surfactant supplied by the Union Carbide Corporation under the trade name L-5340.
[3]Catalyst = mixture employed in the form of a solution in diethylene glycol (DEG) in a weight ratio of 1.18 potassium acetate:1.62 potassium octoate:0.69 DMP-30:6.51 DEG In each foam preparation, a mixture of Items A, B and C was blended in a reaction vessel and cooled to 15.6° C. Item D at 25° C. was then added to the vessel, and all ingredients were mixed at 3600 rpm for 10 seconds. Item E at 25° C. was next mixed into the contents of the vessel over a 2 second interval. All ingredients were thereafter mixed at 3600 rpm for an additional 10 seconds and then poured into a box, yielding a rigid polyisocyanurate foam.

Characteristics of the foams produced (Foams A-E) are shown in the following Table I. The data shown in Table I demonstrates that foams of the present invention (C, D, and E), prepared from low free glycol-containing polyester polyols, have significantly lower thermal conductivity measurements than foams (Foams A & B) prepared from a polyester polyol containing a higher free glycol content.

glycol-containing polyester polyol and water as an additional blowing agent.

In each foam synthesis, the following ingredients in the quantities (g) shown in Table II below were combined as indicated.

| ITEM | INGREDIENT |
|------|------------|
| A | Polymethylene polyphenylisocyanate[1] |
| B | R-11B |
| C | Surfactant 1[2] |
| D | Polyol (See Table II) |
| E | Surfactant 2[3] |
| F | Water |
| G | 1-Methyl-2-pyrrolidinone |
| H | Catalyst[4] |

[1]Of Example 1.
[2]Surfactant 1 = Y-10222 (Union Carbide Corporation).
[3]Surfactant 2 = DC-193 (Dow Corning Corporation).
[4]Of Example 1.

The foam syntheses were conducted according to the procedure of Example 1 utilizing the ingredients and quantities thereof presented in Table II below, except that Surfactant 2, water and 1-methyl-2-pyrrolidinone at 25° C. were added immediately after the polyol to the reaction vessel.

Characteristics of the foams produced (Foams A-C) are shown in the following Table II. The data show the

TABLE I

EVALUATION OF POLYOLS IN POLYISOCYANURATE FOAMS

| | FOAMS | | | | |
|---|---|---|---|---|---|
| | A | B | C | D | E |
| FOAM INGREDIENTS (g) | | | | | |
| Isocyanate | 464.0 | 464.0 | 447.2 | 432.0 | 432.0 |
| R-11B | 110.0 | 110.0 | 110.0 | 110.0 | 110.0 |
| L-5340 | 4.0 | 4.0 | 4.0 | 4.0 | 4.0 |
| Polyol PS-3152C[1] | 136.0 | 136.0 | — | — | — |
| Polyol PS-2402[2] | — | — | 152.4 | — | — |
| Polyol PS-2002[3] | — | — | — | 168.0 | 168.0 |
| Catalyst | 22.9 | 23.4 | 22.9 | 22.8 | 23.0 |
| FOAM PROPERTIES | | | | | |
| Reactivity, sec (Cream/Gel/Firm/Tack-free) | 18/29/34/37 | 17/26/33/35 | 16/25/31/34 | 12/25/30/— | 15/25/29/33 |
| Density, lb/ft$^3$ | 1.72 | 1.78 | 1.79 | 1.78 | 1.88 |
| % Closed Cells | 89.0 | 87.6 | 89.4 | 90.5 | 89.9 |
| Dimensional Stability, 70° C./95% R.H., (% Volume Change) 7 Days | 7.2 | — | 7.4 | 6.7 | — |
| k-Factor Aging of 1" Thick Core Samples: (Btu-in/hr-ft$^2$-°F.) | | | | | |
| Initial | .122 | .117 | .116 | .112 | .112 |
| 11 Days | .138 | .133 | .132 | .126 | .124 |
| 29 Days | .144 | .142 | .136 | .129 | .129 |
| 60 Days | .153 | — | .144 | .134 | — |
| 90 Days | .158 | — | .152 | .141 | — |
| 126 Days | .161 | — | .154 | .144 | — |
| 180 Days | .163 | — | .155 | .148 | — |
| 316 Days | .170 | — | .162 | .157 | — |

[1]Polyol PS-3152C = reaction product of phthalic anhydride and DEG having a hydroxyl number of 320, a viscosity at 25° C. of 2,500 cps and 15% free DEG (Stepan Company).
[2]Polyol PS-2402 = reaction product of phthalic anhydride and DEG having a hydroxyl number of 250, a viscosity at 25° C. of 6,490 cps and 6% free DEG (Stepan Company).
[3]Polyol PS-2002 = reaction product of phthalic anhydride and DEG having a hydroxyl number of 200, a viscosity at 25° C. of 9,120 cps and 4% free DEG (Stepan Company).

EXAMPLE 2

This example illustrates the synthesis of further polyisocyanurate foams (18% trimer) utilizing a free glycol-containing polyester polyol in the presence of a viscosity reducer and water (additional blowing agent).

TABLE II
EVALUATION OF POLYOLS IN POLYISOCYANURATE FOAMS

| | FOAMS | | |
|---|---|---|---|
| | A | B | C |
| FOAM INGREDIENTS (g) | | | |
| Isocyanate | 482.4 | 455.4 | 455.4 |
| R-11B | 83.2 | 83.2 | 83.2 |
| Y-10222 | 4.0 | 4.0 | 4.0 |
| Polyol PS-3152C[1] | 120.6 | — | — |
| Polyol PS-2002[2] | — | 146.5 | 146.5 |
| DC-193 | 6.0 | 6.0 | 6.0 |
| $H_2O$ | 2.1 | 2.0 | 2.0 |
| 1-Methyl-2-pyrrolidinone | — | — | 15 |
| Catalyst | 23.23 | 23.19 | 21.39 |
| FOAM PROPERTIES | | | |
| Reactivity, sec (Cream/Gel/Firm/Tack-free) | 20/40/40/44 | 17/—/36/44 | 13/23/29/38 |
| Density, lb/ft$^3$ | 1.72 | 1.80 | 1.78 |
| % Closed Cells | 88.4 | 87.7 | 90.4 |
| k-Factor Aging of 1" Thick Core Samples: (Btu-in/hr-ft$^2$-°F.) | | | |
| Initial | .146 | .128 | .130 |
| 9 Days | .164 | .140 | .142 |
| 29 Days | .177 | .152 | .153 |
| 60 Days | .182 | .160 | .160 |
| 90 Days | .185 | .162 | .162 |
| 120 Days | .188 | .166 | .167 |
| 180 Days | .188 | .170 | .170 |

[1]Of Example 1.
[2]Of Example 1.

EXAMPLE 3

This example illustrates the synthesis of further polyisocyanurate foams (18% trimer) utilizing a free glycol-containing polyester polyol.

In each foam synthesis, the following ingredients in the quantities (g) shown in Table III below were combined as indicated.

| ITEM | INGREDIENT |
|---|---|
| A | Polymethylene polyphenylisocyanate[1] |
| B | R-11B |
| C | Surfactant[2] |
| D | Polyol (See Table III) |
| E | 1-Methyl-2-pyrrolidinone |
| F | Catalyst[3] |

[1]Of Example 1.
[2]Surfactant = Y-10222 (Union Carbide Corporation).
[3]Of Example 1.

The foam syntheses were conducted according to the procedure of Example 1 utilizing the ingredients and quantities thereof presented in Table III below, except that 1-methyl-2-pyrrolidinone at 25° C. was added immediately after the polyol to the reaction vessel.

The characteristics of the resultant foams (Foams A–C) shown in Table III demonstrate the improved insulation value resulting from use of a low free glycol-containing polyester polyol. The good insulating effect is realized even in the presence of a processing aid such as 1-methyl-2-pyrrolidinone.

TABLE III
EVALUATION OF POLYOLS IN POLYISOCYANURATE FOAMS

| | FOAMS | | |
|---|---|---|---|
| | A | B | C |
| FOAM INGREDIENTS (g) | | | |
| Isocyanate | 464 | 430 | 430 |
| R-11B | 110 | 110 | 110 |
| Y-10222 | 4.0 | 4.0 | 4.0 |
| Polyol PS-3152C[1] | 136 | — | — |
| Polyol PS-2002[2] | — | 170 | 170 |
| 1-Methyl-2-pyrrolidinone | — | 20 | — |
| Catalyst | 22.5 | 21.8 | 22.4 |
| FOAM PROPERTIES | | | |
| Reactivity, sec (Cream/Gel/Firm/Tack-free) | 17/28/34/35 | 9/20/24/38 | 12/22/30/— |
| Density, lb/ft$^3$ | 1.70 | 1.70 | 1.72 |
| % Closed Cells | — | — | 91.41 |
| k-Factor Aging of 1" Thick Core Samples: (Btu-in/hr-ft$^2$-°F.) | | | |
| Initial | .124 | .116 | .112 |
| 11 Days | .134 | .124 | .122 |
| 30 Days | .140 | .130 | .126 |

TABLE III-continued

EVALUATION OF POLYOLS IN POLYISOCYANURATE FOAMS

| | FOAMS | | |
|---|---|---|---|
| | A | B | C |
| 60 Days | .148 | .137 | .133 |
| 90 Days | .151 | .139 | .136 |
| 120 Days | .154 | .144 | .139 |
| 180 Days | .160 | .149 | .146 |

[1]Of Example 1.
[2]Of Example 1.

EXAMPLE 4

This example illustrates the synthesis of polyisocyanurate foams of 250 index utilizing a free glycol-containing polyester polyol contained in a premix and the additional ingredients listed below, including an agent for compatibilizing the premix and water as an additional blowing agent.

| ITEM | INGREDIENT |
|---|---|
| A | Polymethylene polyphenylisocyanate (See Table IV) |
| B | R-11B |
| C | Surfactant[1] |
| D | Polyol (See Table IV) |
| E | Compatibilizer[2] |
| F | Water |
| G | Potassium Octoate |
| H | Amine Catalyst[3] |

[1]Surfactant = DC-193 (Dow Corning Corporation).
[2]Compatibilizer = ethoxylated monylphenol supplied by Pelican Company under the trade name Pelican 630.
[3]Catalyst supplied by Air Products and Chemicals, Inc. under the trade name Polycat 8.

In each foam preparation, Item A at 25° C. was poured into a reaction vessel. A premix of Items B through H at 15.6° C. was then added to the vessel, and all ingredients were mixed at 3,600 rpm for 10 seconds and thereafter poured into a box to yield a rigid polyisocyanurate foam.

Characteristics of the foams produced are shown in the following Table IV. The data demonstrate the production of superior insulating foams from a polyol premix which includes a low free glycol-containing polyester polyol and water as an additional blowing agent.

TABLE IV

EVALUATION OF POLYOLS IN POLYISOCYANURATE FOAMS

| | FOAMS | | | | |
|---|---|---|---|---|---|
| | A | B | C | D | E |
| FOAM INGREDIENTS (g) | | | | | |
| Mondur MR[1] | 403.5 | — | 254 | — | 403.5 |
| Mondur MR-200[2] | — | 409.5 | — | 300.7 | — |
| R-11B | 78 | 78 | 50.2 | 67.9 | 91.2 |
| DC-193 | 3.3 | 3.3 | 3.3 | 3.05 | 3.3 |
| Chardol 570[3] | 165 | 165 | — | — | — |
| Polyol PS-2002[4] | — | — | 165 | 192.5 | 288.75 |
| Pelican 630 | 55.2 | 55.2 | 55.2 | 64.4 | 55.2 |
| H$_2$O | .51 | .51 | .51 | .60 | .51 |
| Potassium Octoate | 4.2 | 4.2 | 4.2 | 4.9 | 4.2 |
| Polycat 8 | .75 | .75 | .75 | .875 | .75 |
| FOAM PROPERTIES | | | | | |
| Reactivity, sec (Cream/Gel/Firm/Tack-free) | 61/—/23/30 | 14/25/30/32 | 5/15/20/20 | 7/19/25/25 | 14/33/40/— |
| Density, lb/ft$^3$ | 1.87 | 1.99 | 2.01 | 2.04 | 2.13 |
| % Closed Cells | 89.78 | 88.25 | 91.09 | 91.30 | 87.94 |
| Dimensional Stability: 70° C./95% R.H., (% Volume Change) 7 Days | 4.3 | 4.2 | 6.4 | 6.9 | 16.9 |
| k-Factor Aging of 1" Thick Samples: (Btu-in/hr-ft$^3$-°F.) | | | | | |
| Initial | .129 | .128 | .116 | .109 | .123 |
| 10 Days | .140 | .133 | .118 | .115 | .128 |
| 32 Days | .154 | .146 | .124 | .121 | .136 |
| 59 Days | .159 | .157 | .130 | .125 | .143 |
| 90 Days | .160 | .158 | .134 | .128 | .144 |
| 118 Days | .166 | .164 | .138 | .132 | .149 |
| 180 Days | .168 | .164 | .140 | .134 | .152 |

[1]Mondur MR = isocyanate having a viscosity of 150-250 centipoises at 25° C., and available from the Mobay Chemical Corporation.
[2]Mondur MR-200 = isocyanate having an equivalent weight of 140, an acidity of 0.03% HCl, and a viscosity of 2000 centipoises at 25° C., and is available from the Mobay Chemical Corporation.
[3]Chardol 570 = polyester polyol having a hydroxyl number of 350 and 12.7% free DEG (Chardonal Division of Freeman Chemical Corporation).
[4]Of Example 1.

I claim:

1. A polyisocyanurate foam comprising the reaction product of an organic polyisocyanate, a blowing agent, a catalyst and a minor amount of a polyol component, wherein the polyol component comprises
   (a) a polyester polyol having a free glycol content of 0 to less than about 7 percent by weight of the polyester polyol or
   (b) a mixture of the polyester polyol with at least one other polyol, the total free glycol content of mixture (b) being 0 to less than about 7 percent by weight of the polyester polyol.

2. The polyisocyanurate foam of claim 1 wherein the polyol component comprises an aromatic polyester polyol having a hydroxyl number of from about 130 to about 750 and an average functionality of about 1.8 to about 5.

3. The polyisocyanurate foam of claim 2 wherein the aromatic polyester polyol comprises the reaction product of at least one member selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, and (h) trimellitic anhydride, and at least one glycol or a mixture of polyols containing at least one glycol.

4. The polyisocyanurate foam of claim 2 wherein the aromatic polyester polyol comprises the reaction product of a polycarboxylic acid component selected from the group consisting of a polycarboxylic acid, a polycarboxylic acid derivative and mixtures thereof, and an aliphatic diol of the generic formula:

HO—R—OH wherein R is a divalent radical selected from the group consisting of:
   (a) alkylene radicals each containing from 2 through 6 carbon atoms, and
   (b) radicals of the formula:

   —(R$^1$O)$_m$—R$^1$— wherein R$^1$ is an alkylene radical containing from 2 through 6 carbon atoms, and m is an integer of from 1 through 4, and
   (c) mixtures thereof.

5. The polyisocyanurate foam of claim 4 wherein the free glycol content of the polyester polyol is less than about 5 percent by weight of the polyester polyol.

6. The polyisocyanurate foam of claim 2 wherein the aromatic polyester polyol comprises the reaction product of a polycarboxylic acid component selected from the group consisting of a polycarboxylic acid, a polycarboxylic acid derivative, and mixtures thereof, and an alkylene glycol having the formula

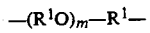
HO—(CH$_2$CHO)$_z$H,
         |
         R$^2$ wherein R$^2$ is hydrogen or lower alkyl of one to four carbon atoms and z is from 1 to 5.

7. The polyisocyanurate foam of claim 6 wherein the alkylene glycol is a member selected from the group consisting of ethylene glycol, diethylene glycol, and mixtures thereof.

8. The polyisocyanurate foam of claim 7 wherein the free glycol content of the polyester polyol is less than about 5 percent by weight of the polyester polyol.

9. The polyisocyanurate foam of claim 6 wherein the polycarboxylic acid component is a member selected from the group consisting of phthalic anhydride, phthalic acid, and mixtures thereof, and the glycol is a member selected from the group consisting of ethylene glycol, diethylene glycol, and mixtures thereof.

10. The polyisocyanurate foam of claim 9 wherein the free glycol content of the polyester polyol is less than about 5 percent by weight of the polyester polyol.

11. The polyisocyanurate foam of claim 9 wherein the aromatic polyester polyol is characterized by a viscosity in cps at 25° C. of about 8,000 to 35,000, a free glycol content of from about 0 through 5 percent by weight of the polyester polyol, and a hydroxyl number within the range of from about 190 to 240.

12. The polyisocyanurate foam of claim 11 wherein the polycarboxylic acid component is phthalic anhydride.

13. The polyisocyanurate foam of claim 1 wherein the blowing agent is a member selected from the group consisting of water, air, nitrogen, carbon dioxide, readily volatile organic substances, compounds which decompose to liberate gases, and mixtures thereof.

14. The polyisocyanurate foam of claim 1 wherein the blowing agent is a member selected from the group consisting of chlorinated and fluorinated hydrocarbons and mixtures of said hydrocarbons with water.

15. The polyisocyanurate foam of claim 1 which includes at least one additive selected from the group consisting of viscosity reducers, flame retardants, dispersing agents, plasticizers, mold release agents, antioxidants, compatibility agents, fillers and pigments.

16. In a process for the production of a polyisocyanurate foam comprising the reaction product of an organic polyisocyanate, a blowing agent, a catalyst and a minor amount of a polyol component, the improvement wherein the polyol component comprises
   (a) a polyester polyol having a free glycol content of 0 to less than about 7 percent by weight of the polyester polyol or
   (b) a mixture of the polyester polyol with at least one other polyol, the total free glycol content of mixture (b) being 0 to less than about 7 percent by weight of the polyester polyol.

17. A laminate comprising at least one facing sheet adhered to the polyisocyanurate foam of claim 1.

18. A laminate comprising at least one facing sheet adhered to the polyisocyanurate foam of claim 4.

19. A laminate comprising at least one facing sheet adhered to the polyisocyanurate foam of claim 7.

20. A laminate comprising at least one facing sheet adhered to the polyisocyanurate foam of claim 9.

21. A laminate comprising at least one facing sheet adhered to the polyisocyanurate foam of claim 12.

22. A polyurethane foam comprising the reaction product of an organic polyisocyanate, a blowing agent, a catalyst, and a polyol component which comprises a polyol mixture containing a polyester polyol having a free glycol content of 0 to less than about 7 percent by weight of the polyester polyol, the amount of the polyester polyol in the polyol mixture being sufficient to reduce the aged k-factor of the resultant foam to below the aged k-factor of the corresponding foam prepared from the same foam-forming composition and having the same index except that the polyol component does not include the polyester polyol.

23. A laminate comprising at least one facing sheet adhered to the polyurethane foam of claim 22.

24. A laminate comprising at least one facing sheet adhered to the polyisocyanurate foam of claim 5.

25. The laminate of claim 17 wherein the blowing agent is a member selected from the group consisting of water, air, nitrogen, carbon dioxide, readily volatile organic substances, compounds which decompose to liberate gases, and mixtures thereof.

26. The laminate of claim 18 wherein the blowing agent is a member selected from the group consisting of water, air, nitrogen, carbon dioxide, readily volatile organic substances, compounds which decompose to liberate gases, and mixtures thereof.

27. The laminate of claim 23 wherein the blowing agent is a member selected from the group consisting of water, air, nitrogen, carbon dioxide, readily volatile organic substances, compounds which decompose to liberate gases, and mixtures thereof.

28. The laminate of claim 24 wherein the blowing agent is a member selected from the group consisting of water, air, nitrogen, carbon dioxide, readily volatile organic substances, compounds which decompose to liberate gases, and mixtures thereof.

* * * * *